United States Patent
Kastner

(10) Patent No.: US 11,571,845 B2
(45) Date of Patent: Feb. 7, 2023

(54) METHOD FOR DETERMINING A TARGET VALUE OF A STATE VARIABLE

(71) Applicant: ENGEL AUSTRIA GmbH, Schwertberg (AT)

(72) Inventor: Clemens Kastner, Linz (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 196 days.

(21) Appl. No.: 16/839,419

(22) Filed: Apr. 3, 2020

(65) Prior Publication Data

US 2020/0316838 A1     Oct. 8, 2020

(30) Foreign Application Priority Data

Apr. 5, 2019 (DE) ..................... 10 2019 108 997.2
Oct. 8, 2019 (AT) ................................ 50853/2019

(51) Int. Cl.
  *B29C 45/78* (2006.01)
  *B29C 45/77* (2006.01)

(52) U.S. Cl.
  CPC .............. *B29C 45/78* (2013.01); *B29C 45/77* (2013.01)

(58) Field of Classification Search
  None
  See application file for complete search history.

(56) References Cited

U.S. PATENT DOCUMENTS

| | | |
|---|---|---|
| 4,816,197 A | 3/1989 | Nunn |
| 4,850,217 A | 7/1989 | Nunn |
| 5,002,475 A | 3/1991 | Graefe |
| 5,256,345 A | 10/1993 | Yokota |

(Continued)

FOREIGN PATENT DOCUMENTS

| | | |
|---|---|---|
| AT | 517128 | 11/2016 |
| AT | 520733 | 7/2019 |

(Continued)

OTHER PUBLICATIONS

Clemens Kastner et al., "Development of measurement method for determination of dynamic solubility limits in injection foam molding", ResearchGate, Conference Paper in AIP Conference Proceedings, Feb. 2019.

(Continued)

*Primary Examiner* — Robert J Grun
(74) *Attorney, Agent, or Firm* — Wenderoth, Lind & Ponack, L.L.P.

(57) ABSTRACT

A method of determining a target value of a state variable includes preparing a mixture of the molding material and the gas with different test values of the state variable, and the mixture is respectively compressed or decompressed. In the compression or decompression step, the state variable of the mixture and/or a further state variable of the mixture is measured directly or indirectly, and determination values of a compression behavior variable characteristic of the compression behavior of the mixture are determined from the measurement values. A criterion directed to a solution state of the gas is checked, and a lowest or highest value of the state variable is deduced at which the gas is in solution in the molding material. The lowest or highest value of the state variable at which the gas is in solution in the molding material is used as the target value.

20 Claims, 6 Drawing Sheets

(56) References Cited

U.S. PATENT DOCUMENTS

Figure 1:
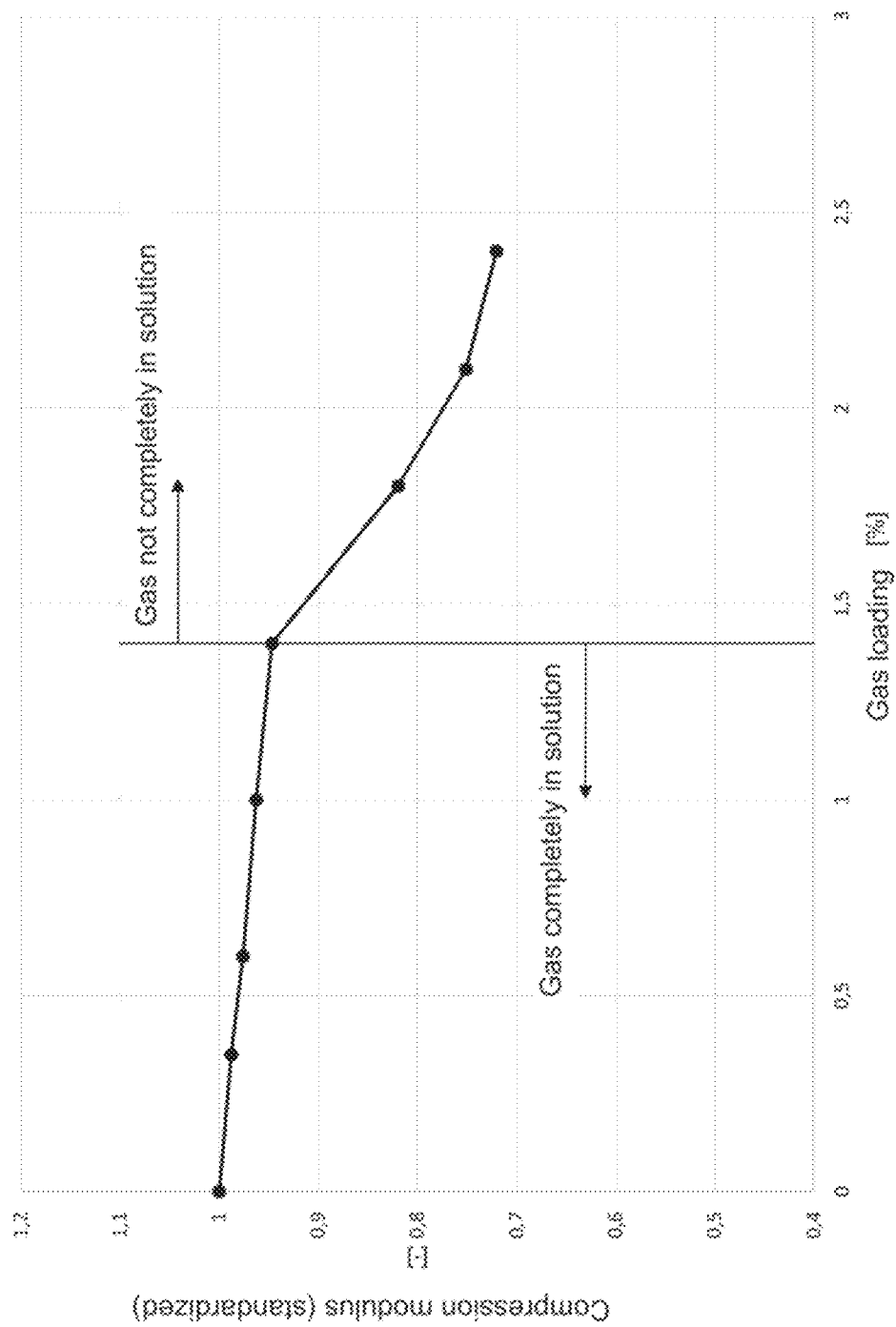

| | | |
|---|---|---|
| 6,284,810 B1 | 9/2001 | Burnham et al. |
| 6,562,276 B1 | 5/2003 | Shelby et al. |
| 6,884,377 B1 | 4/2005 | Burnham et al. |
| 8,980,147 B2 | 3/2015 | Yusa et al. |
| 9,186,634 B2 | 11/2015 | Yusa et al. |
| 9,718,217 B2 | 8/2017 | Yusa et al. |
| 10,357,905 B2 | 7/2019 | Stigsson et al. |
| 10,589,450 B2 | 3/2020 | Pillwein et al. |
| 2001/0000930 A1 | 5/2001 | Kim |
| 2002/0033132 A1 | 3/2002 | Kim |
| 2003/0141625 A1 | 7/2003 | Shelby et al. |
| 2005/0256215 A1 | 11/2005 | Burnham et al. |
| 2013/0285273 A1 | 10/2013 | Yusa et al. |
| 2014/0091489 A1 | 4/2014 | Kim et al. |
| 2015/0103615 A1 | 4/2015 | Yusa et al. |
| 2016/0039116 A1 | 2/2016 | Yusa et al. |
| 2016/0311140 A1 | 10/2016 | Stigsson et al. |
| 2016/0332342 A1 | 11/2016 | Pillwein et al. |
| 2019/0329470 A1* | 10/2019 | Kastner ............... B29C 43/58 |
| 2020/0156300 A1 | 5/2020 | Pillwein et al. |
| 2020/0230851 A1 | 7/2020 | Dix et al. |
| 2020/0254658 A1 | 8/2020 | Dix et al. |
| 2020/0316838 A1 | 10/2020 | Kastner |

FOREIGN PATENT DOCUMENTS

| | | |
|---|---|---|
| CN | 1055504 A | 10/1991 |
| CN | 101028739 A | 9/2007 |
| CN | 101486239 | 7/2009 |
| CN | 105829049 A | 8/2016 |
| CN | 106313458 | 1/2017 |
| DE | 69733286 | 1/2006 |
| DE | 10 2007 030 637 | 1/2009 |
| JP | 2002-67116 | 3/2002 |
| JP | 2008-74114 | 4/2008 |
| JP | 2008-143111 | 6/2008 |
| JP | 2013-107402 | 6/2013 |

OTHER PUBLICATIONS

R. Endlweber et al., "The MuCell—foam injection molding: small cells, big impact", Plastics 103 (2013) 11, pp. 36-40, with English language abstract.

* cited by examiner

METHOD FOR DETERMINING A TARGET VALUE OF A STATE VARIABLE

The present invention concerns a method and a computer program product for determining a target value of a state variable—in particular a back pressure—of a mixture comprising a molding material and a gas, that is intended for a forming process, as well as a forming method and a forming machine having a machine control.

It is known in forming processes to use a gas which is added to the molding material. For example, in the forming process offered by the present applicant under the brand MuCell foamed moldings are produced by admixing a gas to a plastic melt. This involves a direct gassing process. In that case a mixture comprising the molding material and the gas is present in a plasticizing cylinder, in which case so much pressure is to be exerted on the mixture by a plasticizing screw that the gas is in solution in the molding material.

If the gas is not in a solution state, that is to say if there are gas bubbles in the plastic melt, those small gas bubbles can give rise to bubbles, gas cushions or striation in the (hardened) component produced by the plastic forming process. Further consequences can be severe distortion, that is to say severe deviations from the desired component geometry, as far as explosive bursting of the gas cushions referred to. The result of those negative consequences is that the corresponding components are useless and have to be declared as reject.

To be on the safe side, in practice, the back pressure is therefore set too high, which is obviously a disadvantage because in that case the energy consumption is increased (in order to produce the excessively high pressure), the wear on all components involved but, in particular, the plasticizing screw is increased, an only lower level of throughput in the plasticizing operation is achieved and a higher degree of fiber rupture occurs when dealing with fiber-reinforced plastics.

In principle, it is known that there is a relationship between the compression modulus on the one hand and the question of whether the gas is in solution in the molding material on the other hand. In AT 520733 B1 that relationship was used to determine whether the gas is in solution in case of a specific plastic melt.

DE 10 2007 030 637 A1 also discloses a special application from which by ascertaining a compression modulus a quantitative ratio from a powder component and a binder component of an injection-moldable material is derived The state of the art described here concerns plastic injection molding. Similar situations and problems, however, also occur in general forming processes.

The object of the present invention is to provide a method and a computer program product which make it possible to reduce the wear and/or energy consumption when carrying out the forming process, and in doing so it preferably is avoided to actuate the process with undissolved gas in the molding material.

In regard to the method that object is attained by the features of claim 1. That is effected in that:
- the mixture of the molding material and the gas is prepared with different test values of the state variable,
- the mixture which is present with the different test values of the state variable is respectively at least once compressed or decompressed,
- in the compression or decompression step at least the state variable of the mixture and/or at least one further state variable of the mixture is respectively measured directly or indirectly,
- determination values of a compression behavior variable which are characteristic of the compression behavior of the mixture are determined from measurement values of the state variable and/or the at least one further state variable, and
- a criterion directed to a solution state of the gas in the molding material is checked whereby on the basis of the test values and the determination values a lowest or highest value of the state variable at which the gas is in solution in the molding material is deduced and said lowest or highest value of the state variable at which the gas is in solution in the molding material is used as the target value to be determined of the state variable.

In regard to the computer program product the object is attained by the features of claim 17. That is effected by commands which cause an implementing computer
- to control at least one apparatus in such way that the mixture of the molding material and the gas which is present with different test values of the state variable is prepared,
- to control the apparatus in such way that the mixture present at the different test values of the state variable is respectively at least once compressed or decompressed,
- to receive measurement values of at least one sensor, which at least one sensor in compression or decompression of the mixture respectively measures directly or indirectly the state variable and/or at least one further state variable,
- to determine from the measurement values determination values of a compression behavior variable characteristic of a compression behavior of the mixture, and
- to check a criterion directed to a solution state of the gas in the molding material, whereby on the basis of the test values and the determination values a lowest or highest value of the state variable at which the gas is in solution in the molding material is deduced, and to output that lowest back pressure at which the gas is in solution as the back pressure to be determined.

The apparatus referred to here can be a dedicated apparatus for carrying out a method as set forth in claim 1. A preferred embodiment, however, can be one in which the apparatus used is a forming machine which is also provided for carrying out the forming process.

The implementing computer can be a machine control unit of the forming machine.

For the purposes of the present document the terms 'forming process' and 'forming method' are used interchangeably.

The mixture according to the invention is to be understood as at least one mixture. That is to say, it is possible to use a single mixture with various test values of the state variable, or it is possible to provide different mixtures with different test values of the state variable. More correctly, a distinction should be made between the mixture which is intended for the forming method and the mixture or mixtures which is/are provided in accordance with the method according to the invention. In the present document, however, singular and plural of the mixture or mixtures are used interchangeably.

Protection is also claimed for a forming method wherein a method according to the invention for determining the target value of the state variable—in particular the back pressure—of a mixture of a molding material and a gas is carried out and the target value of the state variable is used as the predetermined target value for the forming method.

Protection is further claimed for a forming machine having a machine control unit adapted to cause the forming machine to carry out a method according to the invention.

The term forming machines can be interpreted in this case as injection molding machines, injection presses, presses or the like. The expressions forming processes/forming methods can be understood as being plastic forming processes, in particular injection molding processes, injection forming processes or reactive plastic shaping processes, but also pressing and other casting operations and the like.

The invention makes it possible to optimize the target value for the state variable (that is to say, to minimize it or maximize it in accordance with the respective state variable), thereby achieving an energy saving.

In regard to the back pressure as a state variable to be minimized in accordance with the invention, additionally, it is also possible to reduce wear of a plasticizing screw, increase the throughput, that is to say plasticizing performance, and reduce fiber rupture when dealing with fiber-reinforced plastics.

The invention, however, can also be advantageously used for optimizing a temperature of the mixture as the state variable. In that case possibly slightly worsened flowability of the mixture is balanced out in many cases by the energy saving achieved.

For example, when using carbon dioxide as gas, solubility decreases with increasing temperature. In such a case with the method according to the invention it would also be possible to find an increased temperature for the mixture, at which on the one hand solution of the gas in the molding material is afforded while on the other hand an improvement in flow properties can be achieved.

In this respect, the term 'optimizing' (or 'minimizing' or 'maximizing') is not necessarily used to denote finding an actual optimum in the mathematical sense. Rather from the technical point of view this involves finding an improved value for the state variable.

The molding material may be a—preferably thermoplastic—plastic melt.

The state variable (and the further state variable) of the mixture can be taken as being the thermodynamic state variable. It, however, does not concern the (chemical) composition of the mixture.

The state variable can preferably be a pressure or a temperature. In the present document the 'back pressure' is used as the state variable pressure. Although that expression originates from plastic injection molding, it is to be understood here generally as the pressure of the mixture of the molding material and the gas.

It is, however, also possible to use altered state variables. A trivial example would be the inverse back pressure, which then in accordance with the invention would involve finding a highest value for that state variable, instead of the lowest pressure as when the back pressure itself is the state variable.

Volume can preferably also be used as at least one further state variable to be measured.

Within the scope of the invention, in principle, all intensive state variables can be used as the state variable or the at least one further state variable. In the final analysis it is also conceivable for extensive state values to be used in that way.

The gas for the mixture can be in particular an inert gas (physical foaming), that is to say for example molecular nitrogen or carbon dioxide.

In certain cases of use the invention, however, can also be advantageously used with chemical propellants. That applies in particular in relation to propellants which on the one hand liberate much gas and which on the other hand are used at high levels of concentration.

In the method according to the invention, for the mixtures which involve different test values of the state variable, measurements are made during compression or decompression and the determination values of the compression behavior variable are determined therefrom. That provides an association between the individual test values of the state variable (therefore for example different back pressures) and the determination values (for example different values for the compression modulus). That association can be used in the context of the criterion to establish what is the lowest or highest value of the state variable (therefore, for example, the lowest back pressure), at which the gas is still in solution.

When deducing the lowest or highest value of the state variable at which the gas is in solution in the molding material, one of the test values can be used for the state variable. In principle, however, it would also be possible to interpolate between the test values or to apply other methods to achieve intermediate values between the test values.

When checking the criterion, the determination values and possibly the test values are used to arrive at a solution state of the gas in the molding material. The criterion can in particular take account of the behavior of the compression behavior variable at different test values of the state variable (therefore for example the behavior of the compression modulus at different back pressures).

The criterion can preferably be directed to complete solution of the gas in the molding material. In certain situations, however, it may be sufficient if a small part of the gas is not in solution (if for example the absolute or relative amount of the non-dissolved gas does not exceed a limit value).

In the simplest case, that is to say, for example when the mixture of molding material and gas is fairly precisely known, the criterion can be a limit value for the compression behavior variable. The lowest test value of the state variable, whose (determination value of the) compression behavior variable fulfils the limit value, could then be used as the target value.

In other cases it is possible to use criteria which describe a behavior of the compression behavior variable beyond the various test values of the state variable. Specific examples of such criteria are set forth hereinafter.

Preferably, it can be provided that a single machine is used for carrying out the method according to the invention for determining the target value for the state variable. Particularly preferably, it can be provided that this machine is also that machine which is provided for carrying out the forming process.

For example, the plasticizing unit (also referred to as the injection unit) of an injection molding machine can be used to determine the target value for the back pressure, provide the mixture of plastic and gas under the target value for the back pressure for implementing the forming process and injection into the mold of a forming tool mounted to the closing unit of the injection molding machine.

As an alternative to the use of an injection unit, it is also possible to use plastic melt stored in an intermediate storage means, also referred to as a 'shot pot'.

For providing the mixtures involving different test values of the state variable it is possible in particular to use substantially the same mixture, that is to say it is possible to use substantially the same molding material and substantially the same gas, preferably substantially in the same mixture ratio. It will be appreciated that there can also be deviations arising out of measuring accuracy, the accuracy of control of various machine components, or charge fluctuations.

It can preferably be provided that the method according to the invention is carried out on mixtures prepared in succession—preferably by means of the same machine. It would naturally also be theoretically conceivable to prepare the mixtures on different machines and carry out the method according to the invention in distributed relationship on different machines.

In other words, there is no method sequence which is established from the outset, beyond that which arises due to the logic involved.

An example of a preferred time sequence could look like this:
(i) a first test value for the state variable is selected,
(ii) a mixture of the molding material and the gas is prepared,
(iii) the mixture is at least once compressed or decompressed,
(iv) in compression or decompression, the state variable and/or the at least one further state variable of the mixture is measured,
(v) a first determination value of the compression behavior variable characteristic of the compression behavior of the mixture is determined from measurement values of the state variable and/or the at least one further state variable,
(vi) a second test value differing from the first test value for the state variable is selected and steps (ii) through (v) are repeated with the second test value so that there is a second determination value for the compression behavior variable characteristic of the compression behavior of the mixture,
(vii) steps (ii) through (v) are repeated with selection of further test values differing from the first and second back pressure values so that there are further determination values of the compression behavior variable characteristic of the compression behavior of the mixture, and
(viii) after each implementation of the method or at the end of the method, the criterion and on the basis of the result or results the target value for the state variable is determined.

It will be appreciated that the compression behavior variable can also describe the behavior of the mixture upon decompression if that makes a difference for certain materials.

Compression or decompression of the mixture for a test value of the state variable and measurement of the state variable and/or the further state variable (therefore for example above-indicated steps (iii) and (iv)) can be carried out a plurality of times. The determination values for the compression behavior variable, that are determined from those measurement values, can be averaged for example in an average value calculation or median calculation procedure, in order to permit progressive implementation of the process and to enhance the measurement accuracy of the determination values.

In these repetitions it is also possible to carry out further parameters like for example adaptation of the metering speed in order for example to achieve the same metering time at lower pressures.

In the case of a structure having a plasticizing screw the term metering speed can be used to denote a speed of rotation of the screw (which determines the peripheral speed of the screw).

More specifically, with a lower back pressure even with a more slowly rotating plasticizing screw the same (or similar) plasticizing effect at the mixture can be produced, whereby even with a lower back pressure the metering time does not have to be prolonged.

The metering time can be taken to mean that time for preparing the (desired amount of the) mixture.

Advantageous developments of the invention are defined in the appendant claims.

The point that the state variable for which the target value is to be determined can be a back pressure has already been mentioned.

In such a configuration the method according to the invention can include the following steps:
mixtures of the molding material and the gas, which are under different back pressures, are prepared,
the mixtures under the different back pressures are respectively at least once compressed or decompressed,
upon compression or decompression, the back pressure and/or the at least one further state variable of the mixture is respectively measured directly or indirectly,
determination values of a compression behavior variable that is characteristic of the compression behavior of the mixtures are determined from measurement values of the back pressure and/or the at least one further state variable, and
a criterion directed to a solution state of the gas in the molding material is checked whereby on the basis of the back pressures and the determination values a lowest back pressure is indicated, at which the gas is in solution in the molding material, and that lowest back pressure at which the gas is in solution in the molding material is used as the target value to be determined of the back pressure.

With the method according to the invention, however, it would equally be possible to determine a target value for the temperature of the mixture of the molding material and the gas as even at an excessively low temperature precipitation (or not passing into solution) of the gas in the molding material can occur.

The test values of the state variable are predetermined in open-loop or closed-loop controlled fashion and/or measured upon compression or decompression of the mixtures. In other words, the test values used can be actuation control values for actuators and other controllable elements (for example, heating elements) which occur upon preparation of the mixture by a machine. Naturally measured values can also be used as the test values, which, for example, are measured in the context of a closed-loop control of the actuators or the other controllable elements. Combinations of measured values and control values can also be used.

A pressure change, in particular a pressure increase, and/or a volume change, in particular a volume reduction, of the mixtures can be calculated from the measurement values of the state variable and/or the at least one further state variable upon compression or decompression of the mixture, and the results of that calculation can be used to determine (in particular calculate) the determination values of the compression behavior variable.

In other words, sensors, in particular pressure sensors, can be used for measurement of the compression behavior variable to obtain the measurement values.

In the specific example of a plasticizing unit for an injection molding machine which is equipped with a plasticizing screw (hereinafter also referred to briefly as the 'screw') arranged in a plasticizing cylinder the pressure change and/or the volume change can be detected by a force which the drive of the plasticizing screw exerts on the mixture by way of the plasticizing screw and/or a displacement travel of the screw. Both control values for the drive and measured values can be used for that purpose (for example, predetermined or measured hydraulic pressures or drive moments of an electric drive). The volume change and the pressure change can be calculated from the displacement travel and the known cross-sectional area of the plasticizing cylinder.

During injection of the plastic melt the force detected in that way or the pressure detected in that way are referred to as the injection force and the injection pressure respectively.

A compression modulus and/or compressibility of the mixtures can be used as the compression behavior variable, the determination values of which are determined.

Other compression behavior variables are also conceivable. If, for example, the volume change or the pressure change is known (relative or absolute), then the pressure change or the volume change could also be used as the compression behavior variable.

For example, the volume could also be kept constant, in which case compression or decompression would have to be effected by adding or removing a certain amount of the mixture.

The criterion can be predetermined in such way that at least two of the determination values are taken into consideration in determining the lowest or highest value of the state variable. Preferably, all determination values and test values which were recorded up to a certain moment in time (during implementation of the method according to the invention or at the end) can be used for the criterion. That makes it possible in a simple fashion to take account of the variation in the compression behavior variable over the various test values.

In particular, the criterion could be so predetermined that a curve fit to value pairs of determination values and test values is carried out to a predetermined curve type, wherein a fit curve is obtained from the curve fit and the predetermined curve type is preferably a straight line. Alternatively, other curve types which describe the pattern of the compression behavior variable over the various test values (possibly better) can also be used.

For example, when deducing the lowest or highest value of the state variable at which the gas is in solution, a given one of the test values could be determined, at which the respective determination value and/or the respective test value deviates from the fit curve at least by a predetermined absolute or relative amount.

Preparation of the mixtures, compression or decompression of the mixtures and measurement of the at least one state variable and preferably determination of the determination values can be carried out in succession.

In that respect, it can be particularly advantageous if the criterion is checked after each step of determining one of the determination values. As soon as the criterion is met, more specifically the method can be ended, which can permit the method to be carried out particularly quickly.

Upon successive preparation of the mixtures, successive higher or lower test values can be used for the determination values.

It is to be noted that the introduction of the gas into the molding material and/or the chamber can take place during the plasticizing operation. Introduction of the gas into the molding material can be carried out by injection, in particular, by means of a gas injector.

The method according to the invention can be carried out in partially or fully automated fashion, and in particular the machine control unit of the forming machine can be designed for that purpose.

If a plastic melt is used as the molding material, checking of the criterion directed to the solution state of the gas in the molding material could also be referred to as determining the solution state in the plastic melt.

A pressure of the plastic melt, also referred to as the back pressure, can be used as the state variable.

Preparation of the mixtures, that is to say, the molding material together with the gas, can take place in a chamber.

Compression or decompression of the mixture can then take place by altering the volume of the chamber, in which case the pressure (that is to say the back pressure) in the chamber is altered, in particular increased, from a first pressure value to a second pressure value.

The plastic melt can then be introduced into a mold cavity.

The determination values of the compression behavior variable can then also be referred to as 'at least one compression parameter characteristic of the compression behavior of the plastic melt', which in particular can be the compression modulus, and it can be calculated from the first pressure value and the second pressure value.

The above-mentioned checking of the criterion can be implemented by determining from the determination values of the compression behavior variable whether the gas is substantially completely dissolved in the plastic melt and/or determining a solubility limit of the gas in the plastic melt from the determination values of the compression behavior variable.

Deducing the lowest or highest values of the state variable at which the gas is in solution in the molding material and using same as the target value to be determined of the state variable, can then also be referred to as minimizing the pressure/back pressure.

It is possible to proceed similarly for minimizing the temperature of the plastic melt instead of the back pressure.

In that respect, minimizing the back pressure or the temperature is to be interpreted as reducing the back pressure or temperature, so that nonetheless substantially the complete solution of the gas in the plastic melt is still to be expected on.

The solution state, that is to say, the question of whether or to what degree the gas is completely dissolved in the plastic melt, can be determined with the known relationship between the at least one compression parameter and the solution state, from the at least one compression parameter. In accordance with the invention determining the solution state is deemed to be determining whether the gas is substantially completely in solution in the plastic melt.

An amount of gas above which there is no longer complete solution of the gas in the plastic melt is referred to as the solubility limit. The solubility limit can depend on further parameters like the materials used and the temperature. It can be formulated as an intensive or extensive variable.

For calculation of the determination values of the compression behavior variable, in particular the compression modulus, it is usually also possible to use data in relation to a change in volume, besides a change in pressure.

As already mentioned, it can be provided that an injection unit having a plasticizing screw in a plasticizing cylinder is used, wherein the plasticizing screw is moved in rotation for plasticizing the plastic and is moved axially for injection. Of course, an axial movement of the plasticizing screw can also occur by accumulation of plastic melt in the screw prechamber in the plasticizing procedure. A rotary movement during injection is also possible.

In most cases injection molding machines have injection units with a plasticizing cylinder and a plasticizing screw so that in this advantageous embodiment there is no need to make major structural modifications to carry out the method according to the invention.

Similar advantages in regard to simple implementation of the method according to the invention can be achieved by the use of a screw pre-chamber in a plasticizing cylinder as the chamber in which the mixtures are prepared.

In preferred embodiments it can also be conducive to a simple implementation of the method that the chamber is delimited at the mold cavity side by a shut-off device, preferably in the form of a needle closure nozzle, and/or the chamber is delimited at its side remote from the mold cavity by a plasticizing screw or an injection plunger. Alternatively, it is possible to use a separate chamber for preparation of the mixtures, which is delimited for example by one or more shut-off devices.

It can be provided that compression or decompression of the mixtures is carried out as part of an injection process. For example, an advance movement of a plasticizing screw for injection in an injection molding process can be used for compression of the mixtures. That gives a time saving because compression of the mixtures does not have to be carried out separately.

The invention, however, can also be carried out without the injection of mixture after each compression or decompression.

As already mentioned, the mixtures can be implemented with different test values of the state variable by one and the same mixture at which only the state variable is altered, or new mixtures are prepared for each test value. In the latter case the mixing ratios between the molding material and the gas (that is to say, in particular the concentration of the gas in the molding material) are identical substantially, that is to say within the limits of control and/or measurement accuracy.

In a particularly simple embodiment determination of a change in volume of the chamber can be effected by means of determining a plasticizing screw travel.

Particularly preferably it can be provided that the test values for the state variable—in particular the back pressures—are at least partially selected to be so high that it is to be expected on complete solution of the gas in the molding material. In particular, if the test values are reduced successively from a high starting value based on experience (for example 200 bars), it may be possible that an approach towards an optimized target value of the state variable is effected from a region in which the gas is ensured to be in solution in the molding material.

The test values can be selected at a constant spacing from each other (of for example 20 bars).

During performance of the method according to the invention for determining the target value for the state variable, other state variables can be the subject of open-loop or closed-loop control—preferably in such way that they remain constant. For example, with the back pressure as the state variable the temperature of the mixture as another state variable (or vice-versa) can be controlled to be constant in closed-loop mode, in order to ensure comparability of the individual determination values.

After compression or decompression, the melt can be left unchanged for a period of time (for example, with the state variable and/or further state variables being closed-loop controlled to be constant) so that a thermal equilibrium state prevails in the mixture.

The step of determining the determination values of the compression behavior variable, in particular the compression modulus, can be effected in automated fashion. In particular, for example, after the start of a program for determining the compression modulus, a delay in opening of the closure nozzle can be activated.

Then, for example, a volume change $\Delta V$ and a pressure change $\Delta p$ can be automatically ascertained by the forming machine by way of the machine-internal process data detection system. In accordance therewith, for example, the compression modulus K can be determined automatically after each shot by way of the equation $K=V_0 \, \Delta p/\Delta V$ (with $V_0$ being the volume prior to compression), stored and possibly output.

By virtue of implementation of the points described herein—in particular automated implementation—many decisions can be taken away from the operator and production can be markedly simplified and made more economical. The operator can also be relieved of the load of manual performance by the automation aspect.

The term injection of gas and introduction of gas is used to denote the same thing, that is to say, those expressions are used interchangeably.

Figure 2:
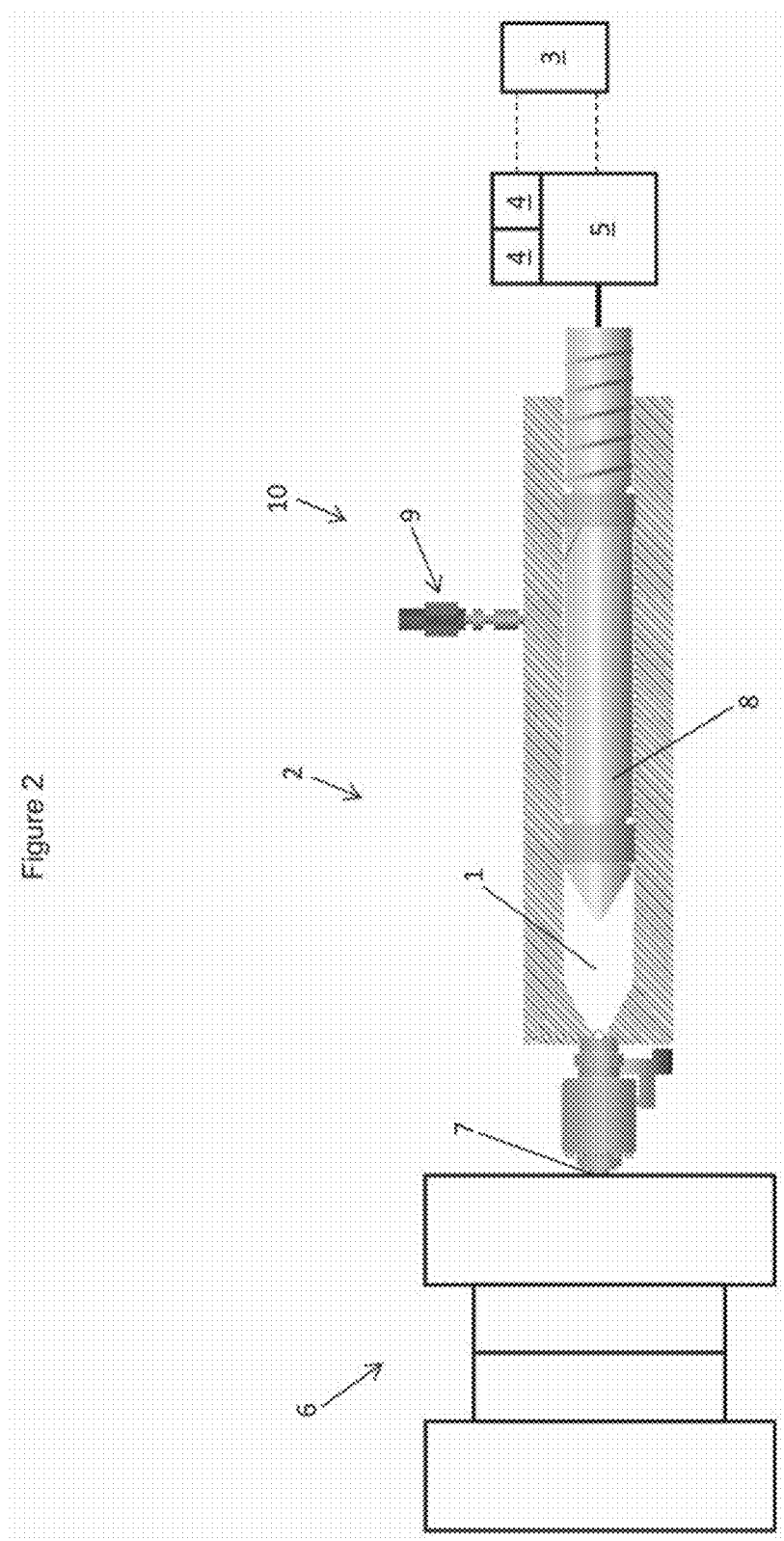
Figure 3A:
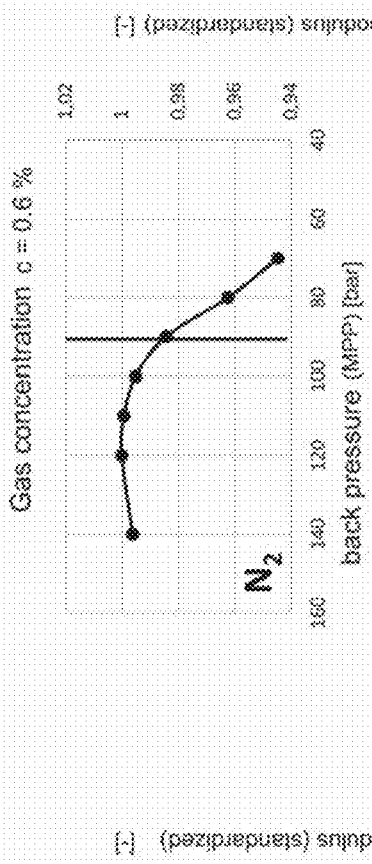
Figure 3B:
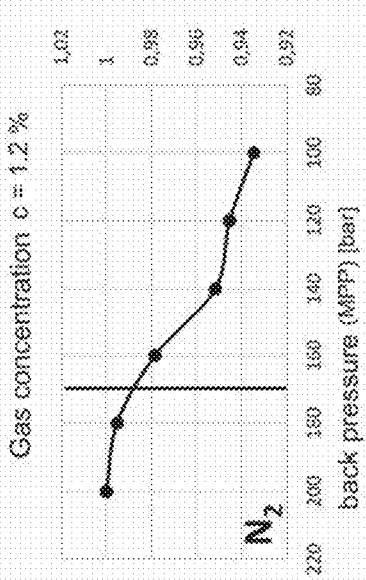
Figure 3C:
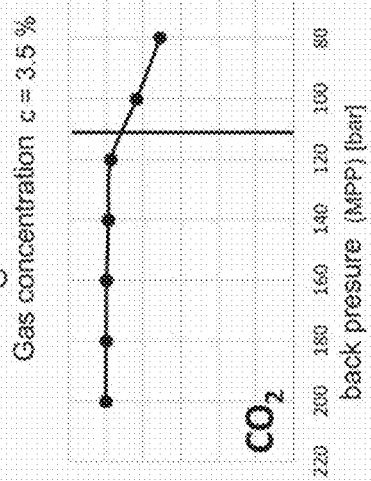

Further advantages and details of the invention will be apparent from the Figures and the related specific description. In the Figures:

FIG. 1 shows a diagram to illustrate the solubility limit of a mixture of a molding material and a gas, FIG. 2 shows an embodiment of an injection molding machine for carrying out a method according to the invention, FIGS. 3a to 3c show diagrams to illustrate the dependency of the solubility limit on the back pressure, and FIGS. 4a to 4f show diagrams to illustrate the method according to the invention.

FIG. 1 shows a diagram in which the compression modulus K of a mixture of a molding material—in particular a plasticized thermoplastic plastic—is plotted against the amount of the gas loading. It is possible to see a characteristic drop in the compression modulus K from a certain gas loading. The beginning of the drop which is marked by a vertical line indicates that point from which the amount of gas in the plastic is so great that the total amount of gas is no longer in solution in the plastic but precipitates in the form of small bubbles and is therefore in the form of a second phase. That point marked with the vertical line is referred to as the solubility limit.

A fundamental aspect of the present invention is that the precise position of the solubility limit depends on the thermodynamic state of the mixture 1 of molding material and gas.

For a forming process in which the mixture 1 is to be used, that means that the state variables describing the thermodynamic state of the mixture 1 must lie within a certain range. Otherwise the gas is not in solution in the molding material, and that adversely affects the forming process.

Before embodiments of the method according to the invention are described, a description of an apparatus/machine preferably used for carrying out a method according to the invention follows, namely a forming machine 2 in the form of an injection molding machine, which is diagrammatically shown in FIG. 2.

FIG. 2 shows a forming machine 2—in this case an injection molding machine. It has an injection unit 10 for producing a plastic melt by plasticizing a plastic (generally in the form of a granulate).

For that plasticizing operation a plasticizing screw 8 is arranged in a plasticizing cylinder. By rotation of the plasticizing screw 8 (shearing heat) and heating of the plasticizing cylinder the plastic is melted and is then present in the form of a plastic melt in the screw pre-chamber in the plasticizing cylinder. That operation of producing the plastic melt is also referred to as 'metering'.

The plasticizing screw 8 can also be moved axially. In particular, the plastic melt can be injected into a mold cavity (not shown separately) by advance movement of the plasticizing screw 8.

In addition, there is a closing unit 6 which has two mounting plates for exerting by way thereof on a mold tool to be mounted thereto a closing force for holding the mold tool closed (also referred to as mold clamping). In the illustrated closed state the forming cavity is formed by the forming tool in the interior thereof.

The drive 5 for the rotating and axial movement of the plasticizing screw 8 and a machine control 3 are only diagrammatically shown.

There is a gas injector 9 for introducing the gas into the plastic melt.

In this embodiment the gas injector 9 is arranged in overlapping relationship with a mixing portion of the plasticizing screw 8.

The mixture 1 of the molding material and the gas is produced in the screw pre-chamber (chamber) by injection of the gas into the plastic melt.

Arranged between the plasticizing cylinder and the forming cavity is a shut-off device 7 which for example can be in the form of a needle closure nozzle.

The shut-off device 7 serves for shutting off the flow of the plastic melt into the forming cavity. In that way the screw pre-chamber can form a closed chamber in which the mixture 1 can be enclosed. The volume of the chamber formed in that way can be altered by axial movement of the plasticizing screw 8.

The drawing diagrammatically shows two sensors 4 provided for detecting the force exerted on the mixture 1 and the axial position (displacement travel) of the plasticizing screw 8. The sensor 4 for detecting the force could measure, for example, a hydraulic pressure in a hydraulic cylinder (as part of the drive 5) that drives the screw advance movement or a torque of an electric machine (as part of the drive 5) driving the screw advance movement. In that way by means of the sensors 4 it is possible indirectly to measure the back pressure MPP and (by way of the known geometry of the plasticizing cylinder and the plasticizing screw 8) the volume of the mixture 1 in the screw pre-chamber.

Of course, the back pressure MPP could also be measured directly by way of a pressure sensor at the screw pre-chamber.

The identification MPP comes from the abbreviation for 'MuCell Process Pressure' for the back pressure in the MuCell method.

The machine control apparatus 3 is connected in signal-conducting relationship to the drive 5 of the plasticizing screw 8 and the sensors 4. The machine control apparatus can be arranged directly at the machine or can be arranged remotely from the machine by way of a data transmission connection.

The compression or decompression of the mixture 1 using the injection molding machine shown in FIG. 2 and the step of determining a determination value of the compression behavior variable (here: compression modulus K) will now be described hereinafter.

After metering operation, the gas-loaded plastic melt, that is to say the mixture, is under the back pressure MPP with the value of the pressure MPP representing one of the test values. Thereupon, the compression procedure is initiated by the forward advance movement of the plasticizing screw 8 with the shut-off device 7 at first remaining closed. The screw advance movement is continued in pressure-regulated fashion until a predetermined increased pressure is reached. The increased pressure can be a value of the test value of the back pressure MPP that is increased by a predetermined pressure difference Δp. The predetermined pressure difference Δp can be for example 400 bars.

The change in volume ΔV can be detected by detecting the distance covered by the plasticizing screw 8 (screw travel) from a value corresponding to the volume of the mixture 1 prior to the reduction to a further value corresponding to the volume of the mixture 1 after the reduction. The increased pressure can be held over a period in order to ensure that an equilibrium state has occurred. The further value of the screw travel is then naturally detected after that period.

As mentioned, the change in volume ΔV and the pressure difference Δp can be detected from the detected screw travel by way of the known diameter of the plasticizing cylinder 6. In a similar way an initial volume $V_0$ of the mixture 1 can be determined before the beginning of compression of the mixture 1. From this data the compression modulus K (that is to say, one of the determination values for the compression behavior variable) defined as:

$$K = -V_0 \frac{\Delta p}{\Delta V}$$

can be calculated.

The shut-off device 7 could then be opened and the process of injecting the mixture 1 into the cavity could be continued. Alternatively, the mixture 1 can be held in the plasticizing cylinder in order to detect a further determination value of the compression behavior variable at a further test value of the back pressure MPP.

In order to understand the method according to the invention, FIGS. 3*a*, 3*b* and 3*c* plot the determination values of the compression modulus K for three different gases (FIGS. 3*a* and 3*b*: molecular nitrogen, FIG. 3*c*: carbon dioxide) at a respective fixed gas concentration (FIG. 3*a*: 1.2%, FIG. 3*b*: 0.6%, FIG. 3*c*: 3.5%) in relation to the test values of the back pressure MPP.

These Figures, too, each show a characteristic drop in the compression modulus K with a falling back pressure MPP. The aim of the method described hereinafter is to find a target value for the back pressure that is as low as possible (to keep the energy consumption for the process as low as possible) and which at the same time is still so high that precipitation of the gas loading (desorption of the gas from the molding material) does not have any adverse influence on the forming process. A corresponding method is described hereinafter with reference to FIGS. 4*a* through 4*f*.

The embodiment starts with determining a first determination value of the compression modulus K for a first back pressure MPP that represents a first test value of the state variable back pressure. This first test value and this first determination value are shown in a diagram in FIG. 4*a*.

Figure 4B:
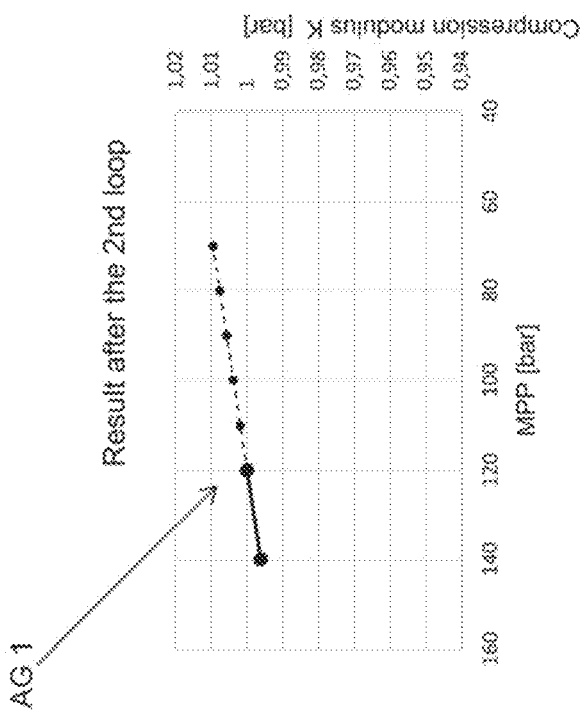
Figure 4A:
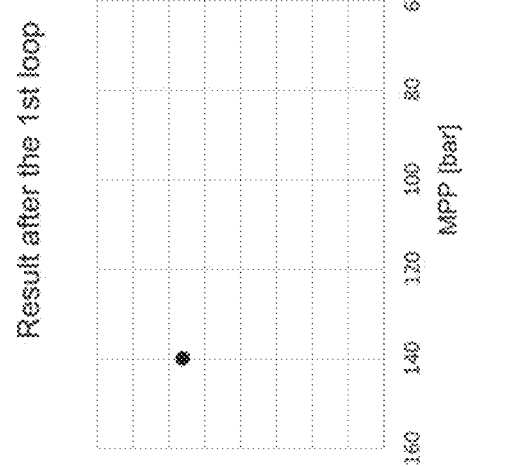

The procedure is repeated so that a second determination value of the compression modulus K is also provided for a second back pressure MPP (a second test value). That is shown in FIG. 4*b*. From the two pairs of values provided it is possible to determine a fit curve in the form of a first best fit straight line AG1 which is also shown in FIG. 4*b*.

Figure 4D:
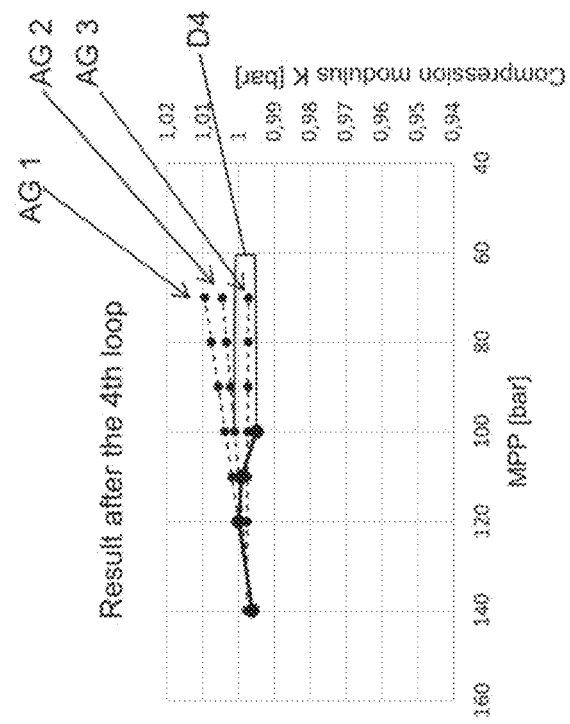
Figure 4C:
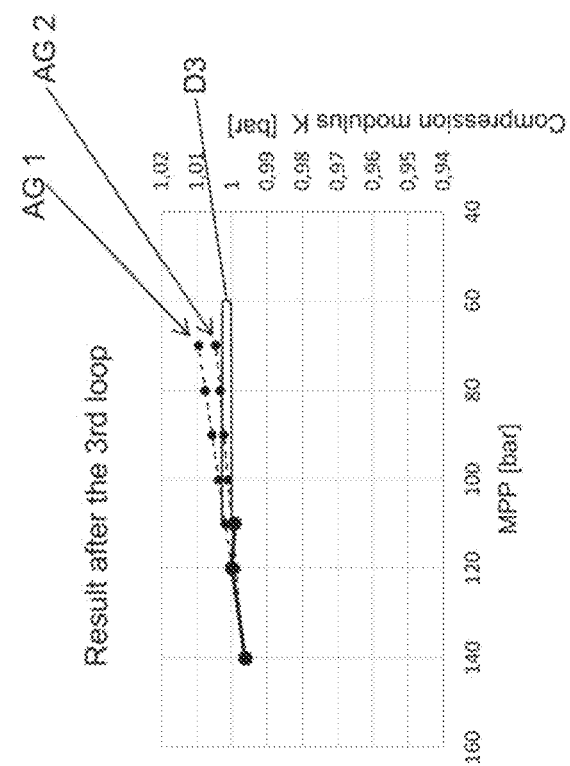

In a third step a third determination value of the compression modulus K is determined for a third back pressure MPP, which is shown in FIG. 4c.

As the criterion directed to the solution state of the gas in the molding material a check is now made to ascertain whether a difference D3 which is a deviation of the third determination value from the best fit straight line AG1 with the third back pressure MPP is below a limit value.

In the present embodiment the limit value is defined relative to the first best fit straight line AG1, more specifically as 2% below the value of the best fit straight line AG1 at the second back pressure MPP (second test value).

In other words, in accordance with the criterion, a check is made as to whether the third determination value is below the best fit straight line AG1 by more than 2%, or not.

That is not the case in FIG. 4c, and for that reason a second best fit straight line AG2 is determined by means of a further curve fit, and this is also shown in FIG. 4c.

The procedure is repeated so that in FIG. 4d there is a fourth determination value of the compression modulus K at a fourth back pressure MPP. The above-described criterion is again checked, in which case the check again turns out to be negative because the difference D4 is less than 2% of the value of the best fit straight line AG2. Consequently a third best fit straight line AG3 is fitted to the determination values and test values present up to that time.

Figure 4E:
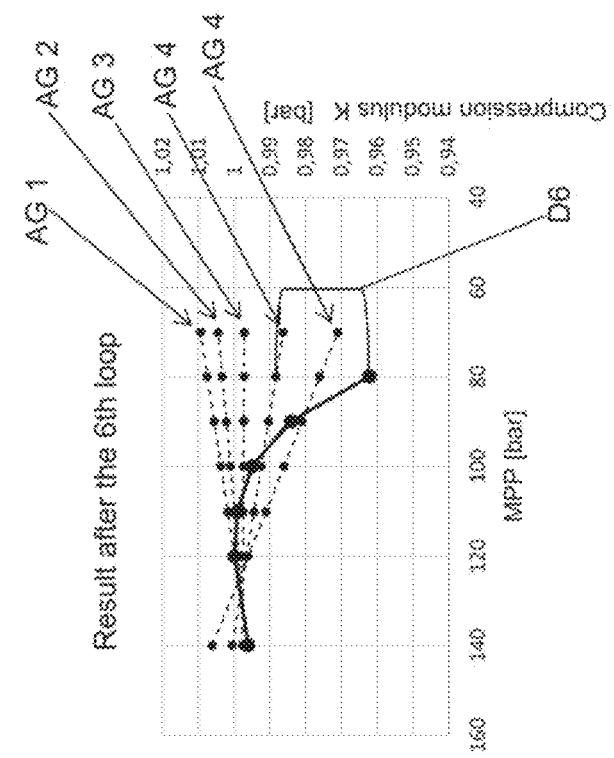

The criterion is also not met in FIG. 4e because the fifth determination value for the back pressure MPP is not more than 2% below the best fit straight line AG3. The best fit straight line AG4 is fitted.

Figure 4F:
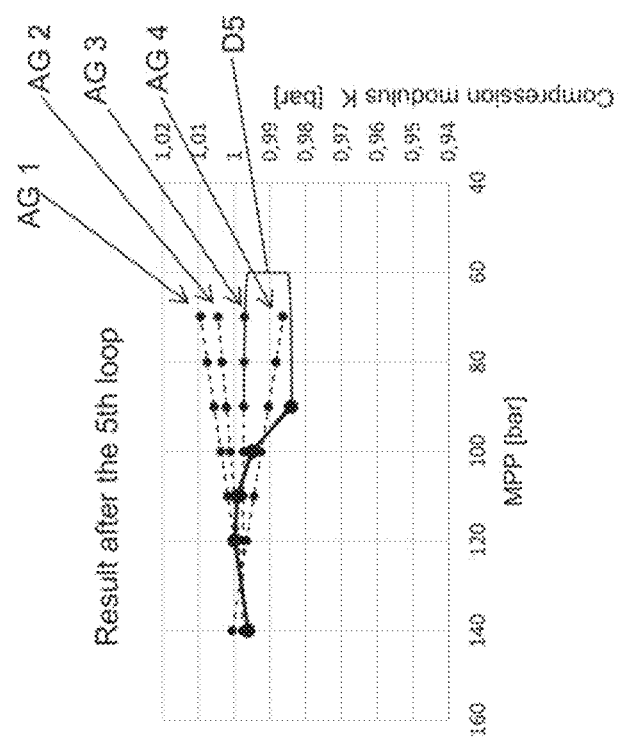

In the next step in FIG. 4f that, however, is already the case, that is to say, the difference D5 of the sixth determination value of the compression modulus K relative to the best fit straight line AG4 is greater than 2% of the value of the best fit straight line AG4.

It can be concluded therefrom that at the sixth back pressure MPP (therefore at the sixth test value) the gas is no longer completely dissolved in the molding material.

Therefore, the fifth back pressure MPP (fifth test value) is selected as the target value for the back pressure MPP in the forming method to be carried out because that is the lowest test value for the back pressure MPP, at which complete solution of the gas in the molding material is still to be assumed.

An interpolation between the sixth test value and the fifth test value could still be attempted at this point in order still further to optimize the back pressure. With the density selected here for the test values for the back pressure that, however, does not have to be absolutely necessary.

A particularly preferred more detailed embodiment in accordance with the above-described concept is set forth hereinafter. Implementation of individual compressions or decompressions and respective measurement of the state variable or the further state variable, possibly together with a forming process, are referred to as 'shots'.

Procedure of a preferred embodiment by way of example:
1. Checking implementability:
   Metering speed should not be above half the possible one (later increase can be necessary).
2. Back pressure to be set at, for example, 200 bars, activate injector.
   Explanation: 200 bars is very high and therefore guarantees solution of industrially used gas contents.
   Comment: the actual back pressure can be made dependent on the preselection of material and gas content, that is to say it can therefore also be below 200 bars. Stored benchmark values can be used for that purpose.

From here counting is in loops:
1. Carry out 10 shots (with a single change in the MPP in following loops 5 shots may also be sufficient) without changing other settings (progressive initiation, enrichment of gas).
2. Iterative adaptation (increase/reduction) in the metering speed to hold metering time (in the ideal case: metering time new=metering time compact; criterion: time is within a 5% region around a target metering time).
3. Further 5 shots after adapted metering time (process stabilization; time should not move out of the 5% region around the target metering time).
4. Measurement of the compression modulus in 10 following shots→average value formation.
5. Comparison of the measurement with extrapolated value of the preceding loop at the same pressure (as of the 3rd loop).
6. Reduction of the MPP by 10 bars.
7. Calculation of a best-fit straight line by previous measurement values (as of the 2nd loop).
8. Repetition of steps 3-8 as long as the compression modulus is less than 1% below the extrapolated best-fit straight lines (checking of the criterion only as of the 3rd loop).
9. Last MPP before that outlier corresponds at least to necessary MPP.

As already mentioned, this method can also be carried out similarly with a temperature of the mixture 1 as the state variable to be optimized (that is to, say minimized or maximized).

This embodiment can be implemented in fully automated fashion in a central machine actuation or control unit of a forming machine, in particular an injection molding machine. The operator then only still has to predetermine the desired gas content in the mixture.

The invention claimed is:

1. A method of determining a target value of a state variable of a mixture of a molding material and a gas, that is intended for a forming process, wherein:
   the mixture of the molding material and the gas is prepared with different test values of the state variable,
   the mixture which is present with the different test values of the state variable is respectively at least once compressed or decompressed,
   in the compression or decompression step at least the state variable of the mixture and/or at least one further state variable of the mixture is respectively measured directly or indirectly,
   determination values of a compression behavior variable which is characteristic of the compression behavior of the mixture are determined from measurement values of the state variable and/or the at least one further state variable, and
   a criterion directed to a solution state of the gas in the molding material is checked whereby on the basis of the test values and the determination values a lowest or highest value of the state variable is deduced at which the gas is in solution in the molding material and said lowest or highest value of the state variable at which the gas is in solution in the molding material is used as the target value to be determined of the state variable.

2. The method as set forth in claim 1, wherein the state variable is a back pressure (MPP) of the mixture.

3. The method as set forth in claim 1, wherein the state variable is a temperature of the mixture.

4. The method as set forth in claim 1, wherein the test values of the state variable are predetermined in open-loop or closed-loop controlled fashion and/or measured upon compression or decompression of the mixture.

5. The method as set forth in claim 1, wherein a change in pressure (Δp) and/or a change in volume (ΔV) of the mixture is calculated from the measurement values of the state variable and/or the at least one further state variable and are used for determining the determination values.

6. The method as set forth in claim 5, wherein the change in pressure (Δp) is an increase in pressure and the change in volume (ΔV) is a reduction in volume.

7. The method as set forth in claim 1, wherein a compression modulus and/or a compressibility of the mixture is used as the compression behavior variable whose determination values are determined.

8. The method as set forth in claim 1, wherein the criterion is predetermined in such way that at least two of the determination values are taken into consideration in determining the lowest or highest value of the state variable.

9. The method as set forth in claim 8, wherein the criterion is predetermined in such way that a curve fit to value pairs of determination values and test values is carried out to a predetermined curve type, wherein a fit curve (AG1, AG2, AG3, AG4) is obtained from the curve fit.

10. The method as set forth in claim 9, wherein when deducing the lowest or highest value of the state variable at which the gas is in solution a given one of the test values is deduced, at which the respective determination value and/or the respective test value deviates from the fit curve at least by a predetermined absolute or relative amount (D3, D4, D5, D6).

11. The method as set forth in claim 9, wherein the predetermined curve type is a straight line.

12. The method as set forth in claim 1, wherein the step of preparing the mixture with different test values of the state variable, compression or decompression of the mixture and measurement of the at least one state variable and the step of determining the determination values are performed successively.

13. The method as set forth in claim 12, wherein the criterion is checked after each step of determining one of the determination values.

14. The method as set forth in claim 12, wherein upon successive provision of the mixture, successive higher or lower test values are used for the state variable.

15. The method as set forth in claim 1, wherein:
a plastic melt is used as the molding material,
a back pressure (MPP) or a temperature of the plastic melt is used as the state variable,
checking of the criterion directed to the solution state of the gas in the molding material is implemented as the step of determining the solution state in the plastic melt,
the mixture, that is to say, the molding material together with the gas, is produced in a chamber,
compression or decompression of the mixture is implemented by varying the volume of the chamber, wherein the dynamic pressure (MPP) in the chamber is changed from a first pressure value to a second pressure value,
the plastic melt is introduced into a forming cavity,
the determination values of the compression behavior variable are calculated from the first pressure value and the second pressure value,
from the determination values of the compression behavior variable it is determined whether the gas is substantially completely dissolved in the plastic melt and/or a solubility limit of the gas in the plastic melt is determined from the determination values of the compression behavior variable, and/or
concluding the lowest or highest values of the state variable at which the gas is in solution in the molding material and using same as the target value to be determined of the state variable is implemented by minimizing the back pressure (MPP).

16. The method as set forth in claim 15, wherein the dynamic pressure in the chamber is increased from the first pressure value to the second pressure value.

17. A forming method, comprising the method as set forth in claim 1 using the target value of the state variable as the predetermined target value for the forming method.

18. A forming machine comprising a machine control unit configured to cause the forming machine to carry out the method as set forth in claim 1.

19. The forming machine as set forth in claim 18, wherein the machine control unit is configured to carry out the method as set forth in claim 1 in partially or fully automated fashion.

20. A non-transitory computer-readable storage medium storing a program for carrying out the method as set forth in claim 1 for determining a target value of a state variable of a mixture of a molding material and a gas that is intended for a forming process including commands which cause an implementing computer:
to control at least one apparatus in such way that the mixture of the molding material and the gas which is present with different test values of the state variable is prepared,
to control the apparatus in such way that the mixture present with the different test values of the state variable is respectively at least once compressed or decompressed,
to receive measurement values of at least one sensor, which at least one sensor in compression or decompression of the mixture respectively measures directly or indirectly the state variable and/or at least one further state variable,
to determine from the measurement values determination values of a compression behavior variable characteristic of a compression behavior of the mixture, and
to check a criterion directed to a solution state of the gas in the molding material, whereby on the basis of the test values and the determination values a lowest or highest value of the state variable at which the gas is in solution in the molding material is obtained, and to output that lowest back pressure at which the gas is in solution as the back pressure to be determined.

* * * * *